United States Patent
Challener et al.

(10) Patent No.: US 8,504,810 B2
(45) Date of Patent: Aug. 6, 2013

(54) REMOTE PC BOOTUP VIA A HANDHELD COMMUNICATION DEVICE

(75) Inventors: David Carroll Challener, Raleigh, NC (US); Daryl Cromer, Cary, NC (US); Howard Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1469 days.

(21) Appl. No.: 11/861,577

(22) Filed: Sep. 26, 2007

(65) Prior Publication Data

US 2009/0083534 A1   Mar. 26, 2009

(51) Int. Cl.
G06F 9/00 (2006.01)
G06F 15/177 (2006.01)

(52) U.S. Cl.
USPC ............... 713/2; 713/1; 713/168; 713/170; 726/2; 726/3; 726/4; 726/5

(58) Field of Classification Search
USPC .................. 713/1, 2, 168, 170; 726/2, 3, 4, 726/5
See application file for complete search history.

(56) References Cited

U.S. PATENT DOCUMENTS

| | | | | |
|---|---|---|---|---|
| 6,366,957 | B1 * | 4/2002 | Na | 709/229 |
| 6,606,709 | B1 * | 8/2003 | Connery et al. | 726/14 |
| 7,024,690 | B1 * | 4/2006 | Young et al. | 726/5 |
| 7,228,417 | B2 * | 6/2007 | Roskind | 713/168 |
| 7,650,509 | B1 * | 1/2010 | Dunning | 713/184 |
| 7,765,407 | B2 * | 7/2010 | Locker et al. | 713/183 |
| 2004/0199795 | A1 * | 10/2004 | Grewal et al. | 713/202 |
| 2004/0235424 | A1 * | 11/2004 | Kim | 455/68 |
| 2005/0144493 | A1 * | 6/2005 | Cromer et al. | 713/310 |
| 2006/0059363 | A1 * | 3/2006 | Mese et al. | 713/185 |
| 2006/0085845 | A1 * | 4/2006 | Davis et al. | 726/6 |
| 2006/0112420 | A1 * | 5/2006 | Challener et al. | 726/5 |
| 2007/0022285 | A1 * | 1/2007 | Groth et al. | 713/155 |
| 2007/0130477 | A1 * | 6/2007 | Barbian et al. | 713/193 |
| 2008/0022099 | A1 * | 1/2008 | Kawano et al. | 713/168 |
| 2008/0077809 | A1 * | 3/2008 | Hayler et al. | 713/193 |
| 2008/0104424 | A1 * | 5/2008 | Jennings | 713/300 |
| 2008/0123858 | A1 * | 5/2008 | Perlman et al. | 380/278 |
| 2008/0148389 | A1 * | 6/2008 | Locker et al. | 726/17 |
| 2008/0168286 | A1 * | 7/2008 | Tupman | 713/320 |
| 2008/0170569 | A1 * | 7/2008 | Garg et al. | 370/390 |
| 2009/0006857 | A1 * | 1/2009 | Cheng | 713/183 |
| 2009/0172443 | A1 * | 7/2009 | Rothman et al. | 713/323 |

* cited by examiner

Primary Examiner — Jaweed A Abbaszadeh
(74) Attorney, Agent, or Firm — Ference & Associates LLC

(57) ABSTRACT

A method computer usable medium and computer system circuitry are disclosed for starting or "booting up" a computer from a remote location using a remote command device such as a cellular telephone. The method and system includes a secure means for remotely storing and transmitting security passwords.

20 Claims, 2 Drawing Sheets

REMOTE PC BOOTUP VIA A HANDHELD COMMUNICATION DEVICE

BACKGROUND OF THE INVENTION

1. Field of Invention

The present invention generally relates to starting a digital data processor remotely via a handheld communication device.

2. Description of Related Art

After having been shut down, a computer user must perform a series of start-up operations, commonly known as boot-up, before the computer is ready for service. For purposes of this description, boot-up may include powering up the computer, and allowing access to password protected segments of the computer and its associated software and hardware systems. Conventionally, initiation of the boot-up sequence requires the user's physical presence at the computer terminal. As computers and their stored software become more complex, the boot up process tends to require an unacceptably long period time to perform the necessary operations and routines.

Computers are commonly interconnected via a network. Typically, personal computers (PCs) interface with the network by means of a network interface card, having a unique address, which is designed to continually monitor incoming packets over the network. When the network interface card detects an incoming packet containing its unique address, the network interface card will identify itself as the intended recipient of the packet.

One special purpose incoming message is known as a Magic packet. The Magic Packet is a broadcast frame having a configuration comprising a defined constant followed by sixteen repetitions of the target computers network interface card address possibly followed by a four or six bite password. A common application of Magic Packet technology is the remote commanding of computer states including waking the computer from an "off" or "hibernated" state.

A computer in a power down state may be in a "suspended power state" or a "hibernated power state." In general a computer in a suspended power state is similar to a computer with all power removed except that power to memory is maintained and dynamic RAM (DRAM) is refreshed. In addition, the operations of the computer are held in a suspended power state for a suspend operation, whereas the system loses its current operational state on a general power down.

SUMMARY OF THE INVENTION

It is observed, by the inventors, that it would be desirable to have a means for remotely initiating a computer's boot up process in a network system in a safe and secure configuration. It would be preferable to provide for initiation of the boot up procedure using a remote, wireless communication device such as a cellular telephone, wireless text messaging system and the like.

Embodiments herein disclosed include a method comprising: detecting at a network client system a packet of remotely transmitted data; deciphering at least a portion of the data in the detected packet to produce a password key; determining if the password key allows access to a password required for boot-up; recovering the password if the password key allows access to such password; and utilizing the password in the client system to boot-up the client system.

Embodiments further include a computer-usable medium having computer readable instructions stored thereon for execution by a processor to: detect at the a network client system a packet of remotely transmitted data; decipher at least a portion of the data in said detected packet to produce a password key; determine if the password key allows access to a password required for boot-up; recover the password if the password key allows access to such password: and utilize the password in the client system to boot-up the client system.

Embodiments also include apparatus comprising: a network interface configured to detect a remotely transmitted data packet; an electronic memory; a processor which is operatively coupled to the network interface and to the electronic memory which executes code stored in the electronic memory, the processor, in response to execution of the code deciphers at least a portion of the data in the detected packet to produce a password key, determines if the password key allows access to a password required for boot-up, recovers the password if the password key allows access to such password, and utilizes the password to boot-up.

DETAILED DESCRIPTION

Figure 1:
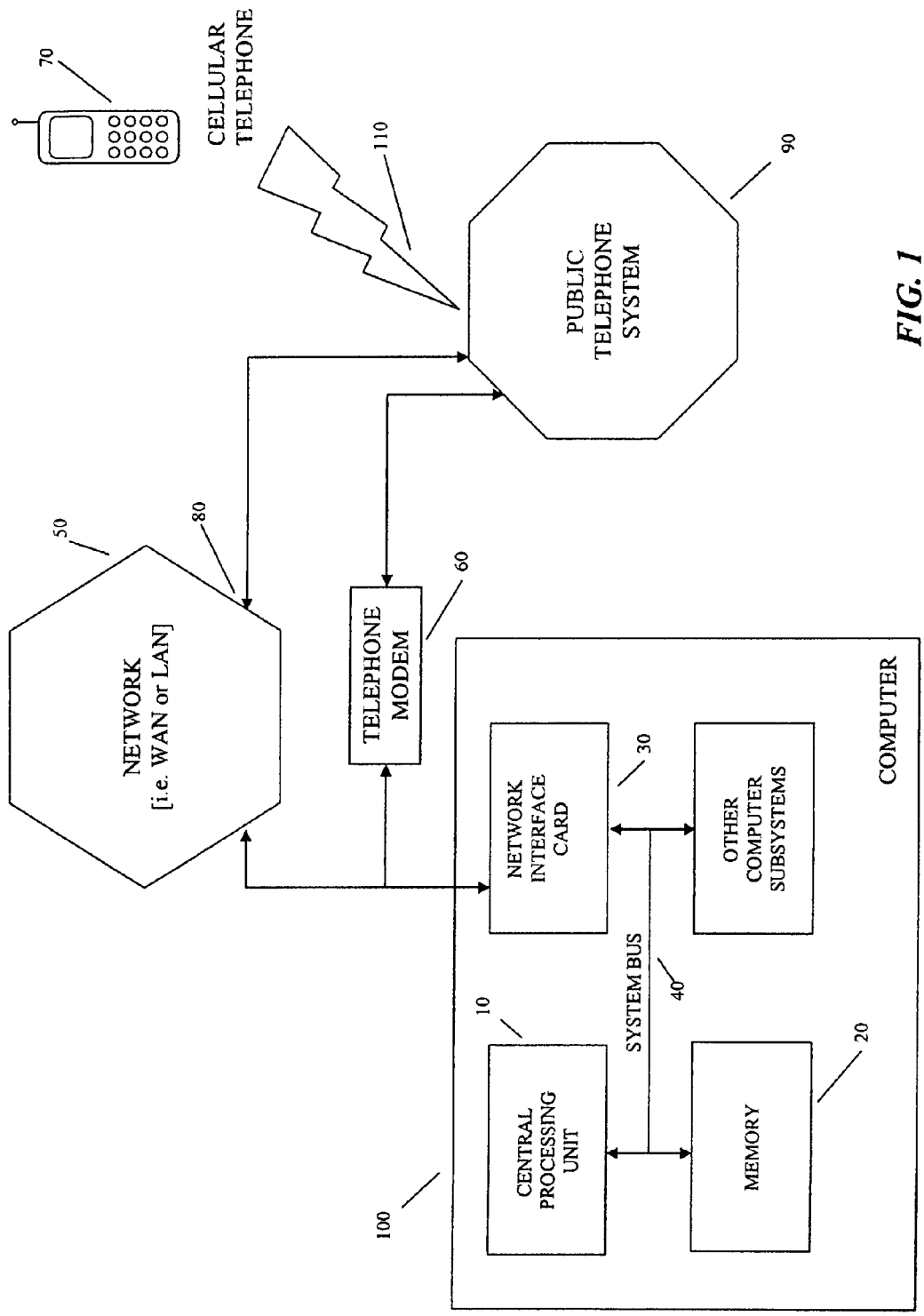
FIG. 1 is a simplified schematic presentation of the computer, a cellular telephone used as a remote command device and the interconnection facilities.

Embodiments herein described include the means and methods for remotely initiating the secure boot up process of a user's computer.

In an embodiment a computer executes an algorithm when it is shut down as part of a "shutdown event." The algorithm initially generates a first random number, "R", that is transmitted as al SMS message to a user specified wireless communication device, such a cellular telephone via a network interface card to a computer network or telephone modem. The wireless communication device stores the received SMS message. The computer does not store the generated first random number but does generate and store a second random number mathematically related to the first random number and to a boot-up security password. The security password may be, for instance, either the hard file password (HDP) or the power on password (POP). The machine is then placed into its "sleep" state.

Subsequently, when it is desired to boot up the computer, the wireless communication device, such as a cellular telephone, is used to send the stored SMS message to the computer. The random number contained in the SMS message is used to mathematically operate on the computer stored second random number thereby producing the boot-up security password. Boot up is then initiated. The BIOS checks that the system is booting only to the correct hard disk. If the correct disk is confirmed, then the hard file is released and the system will boot up to the operating system log in prompt.

Embodiments herein include a method for remotely waking up a client system within a network, the client system requiring a power-on password for powering on the system. The method comprises the steps of detecting at the network client system a packet of remotely transmitted data decipherable as a password key, determining if the password key allows access to the power-on password, recovering the power-on password if the password key allows access to the password, and utilizing the power-on password in the client system to power on the client system.

Other embodiments comprise a method for remotely waking up a network client system, the system having stored thereon a first key reflective of a power-on password. The key is accessible via a short text message. The method comprises the steps of detecting at the network client system a packet of transmitted data decipherable as a short message service, determining if the short message service allows access to the power-on password, and releasing the power-on password to the network client system if the short message service allows access.

Other embodiments disclosed are a system for remotely waking up a client system within a network comprising means for detecting a transmitted packet of data which includes a random number, means for determining if the random number in the transmitted packet of data allows access to a power-on password associated with the client system, and means for utilizing the power-on password in the client system if the random number allows access to the power-on password.

Referring to FIG. 1, a simplified example of conventional personal computer architecture 100 is schematically presented. The architecture comprises a central processing unit (CPU) 10, a system memory 20, and a network interface card 30, interconnected by a system bus 40. The network interface card 30 connects with the external network 50 of other network nodes. The network interface card 30 may, in addition, connect to a telephone modem 60 for directly accessing the public telephone system 90. The interface with the public telephone system can thereby, provide connectivity between any cellular. Wirelessly or wired telephone device and the computer's network interface card 30. Similarly this connectivity may be indirectly provided by way of the computer network 50 if the network has a portal 80 with the public telephone system.

The computer 100 will typically be in one of three states at the time remote boot up is desired designated as S3 (suspend), S4 (hibernate), or S5 (off). It is assumed that the user is uncertain of the current state. Sending the remote boot up command should thus take the appropriate action regardless of the initial computer state. With respect to system security, Power On Password (POP) protection is typically employed. Although available, Privilege Access Password or Adm in Password and Hard Disk Password (HDP) are not usually employed.

The system to enable remote boot up of the computer is comprised of the target computer 100 including a network interface card 30, a remote command device such as a cellular telephone 70, a network 50 or other communications means to provide remote connectivity between the computer's network interface card and the remote command device. Other examples of suitable remote command devices include personal digital assistants (PDAs), Blackberries™ or other similar devices, having a read-write memory and capable of providing communications, with the computer, via a network or the public telephone system. Additionally, the computer 100 may include algorithmic processes or programs stored in the computers memory to implement the necessary action.

Figure 2:
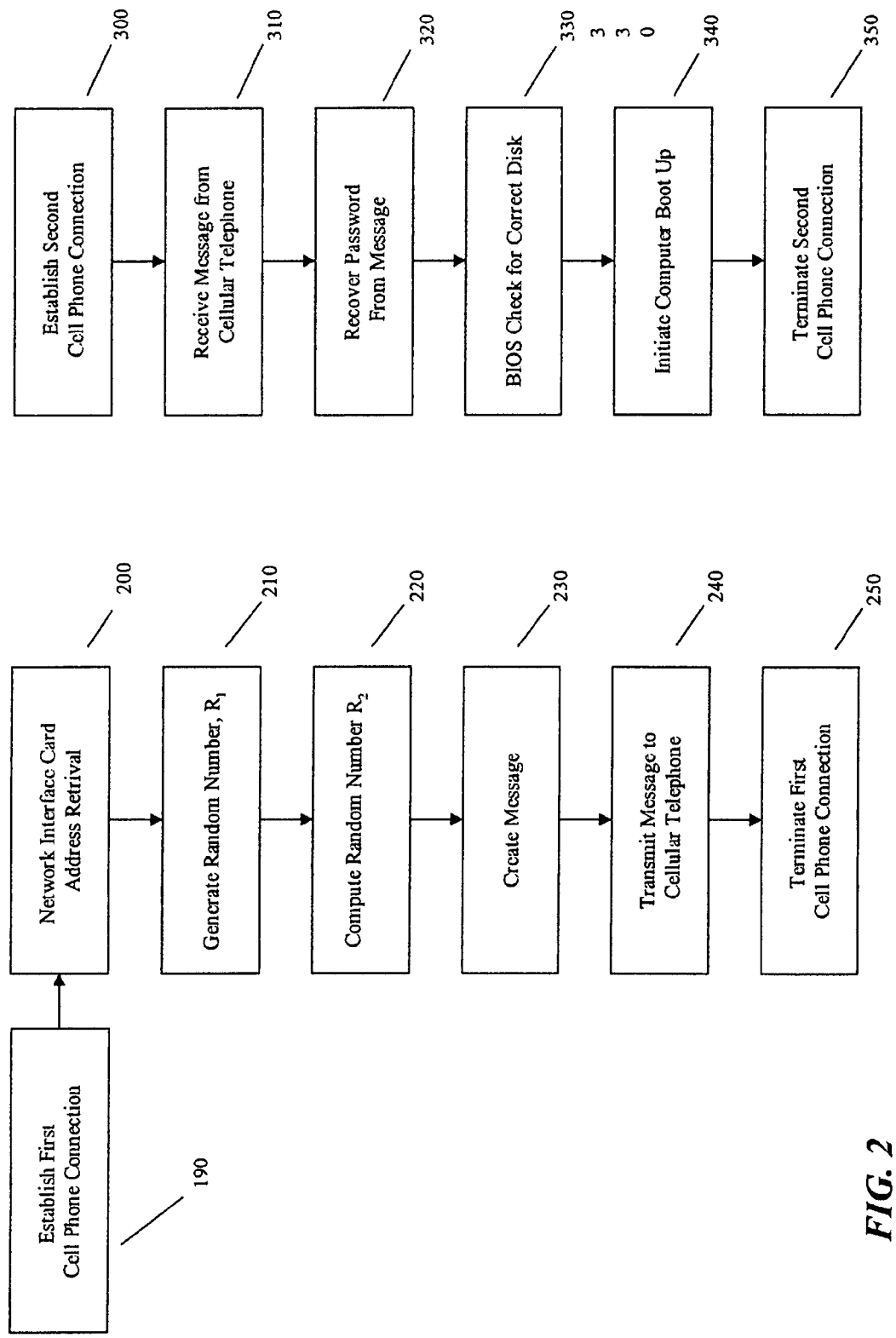
FIG. 2 is a conceptual flow chart of the sequence of operations for accomplishing remote computer boot up.

As shown in FIG. 2, a communications connection is established 190 between the computer 100 and the remote command device 70. The NIC address retrieval algorithm 200 is run and obtains the address of the network interface card 30. A random number, $R_1$, is generated 210 by the computer. $R_1$ may be transmitted from the computer 100 to the remote command device 70 and stored in the device s memory. The computer 100 performs a mathematical operation between $R_1$ and a computer password required for boot-up such as the power-on password (POP) or the hard drive password (HDP) thereby generating a new random number $R_2$. Examples of suitable mathematical operations are either [$R_{1low}$ XOR POP] or [$R_{1high}$ XOR HDP]. Thus, for instance, $R_{1low}$ XOR POP=$R_2$. The computer 100, discards $R_1$, saves $R_2$ in memory, and is subsequently locked-down. When it is desired to restart the computer 100, the random number, $R_1$, may be transmitted, in a message, from the remote command device 70 to the computer. The message may be formatted to comply with Magic Packet. The Magic Packet is a broadcast frame having a configuration comprising a defined constant followed by sixteen repetitions of the target computers network interface card address possibly followed by a four or six byte password. A common application of Magic Packet technology is the remote commanding of computer wakeup. The computer 100 performs a complementary mathematical operation on received random number $R_1$ and computer stored random number $R_2$ thereby generating the password required for boot-up. Thus, for the instance sited above, $R_{1low}$ XOR $R_2$=POP. This procedure provides security for the password, if the remote command device is lost or stolen.

In another embodiment, a random number, $R_1$, is generated 210 by the computer. The computer 100 performs a mathematical operation between $R_1$ and a computer password required for boot-up such as the power-on password (POP) or the hard drive password (HDP) thereby generating a new random number $R_2$. $R_2$ may be transmitted from the computer 100 to the remote command device 70 and stored in the device's memory. The computer 100, discards $R_2$, saves $R_1$ in memory, and is subsequently locked-down. When it is desired to restart the computer 100, the random number, $R_2$, may be transmitted from the remote command device 70 to the computer. The computer 100 performs a complementary mathematical operation on received random number $R_2$ and computer stored random number $R_1$ thereby generating the password required for boot-up.

STATEMENT REGARDING PREFERRED EMBODIMENTS

While the invention has been described with respect to preferred embodiments those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

We claim:

1. A method comprising:
    receiving a packet of data from a mobile communication device, said packet comprising a boot request for a client system;
    detecting at said client system the packet of data remotely transmitted from said mobile communication device;
    deciphering at least a portion of the data in said detected packet of data to produce a password key;
    determining if said password key allows access to a password required for boot-up;
    recovering said password if said password key allows access to such password; and
    utilizing said password in said client system to boot-up said client system.

2. The method, in accordance with claim 1, wherein said password is chosen from the group consisting of power-on password, hard file password, administrative password, and a BIOS password.

3. The method, in accordance with claim 1, wherein said packet of data is produced by said communication device.

4. The method, in accordance with claim 3, wherein said communication device is chosen from a group consisting of a cell phone, a wireless personal digital assistant, a Blackberry, and another network client.

5. The method, in accordance with claim 1, where said packet of data complies with the format requirements of a Magic Packet message.

6. The method, in accordance with claim 1, where said packet of data is a SMS (Short Message Service) message.

7. The method, in accordance with claim 1, wherein said packet of data comprises a random number.

8. The method, in accordance with claim 1, wherein said password is associated in said client system with a random number related to data included in said packet of data.

9. The method, in accordance with claim 1, wherein said password key is formed by performing a mathematical operation using said password and a random number.

10. The method, in accordance with claim 1, wherein said boot-up further comprises performing a BIOS check.

11. A computer-usable storage device having computer readable instructions stored thereon for execution by a processor of a client system, said instructions, when executed by said processor, allowing said client system to:
   detect at said client system a packet of data remotely transmitted from said mobile communication device;
   decipher at least a portion of the data in said detected packet of data to produce a password key;
   determine if said password key allows access to a password required for boot-up;
   recover said password if said password key allows access to such password; and
   utilize said password in said client system to boot-up said client system.

12. The computer-usable storage device, in accordance with claim 11, where said password is chosen from the group consisting of power-on password, hard file password, administrative password, and BIOS password.

13. The computer-usable storage device, in accordance with claim 11, wherein said password is associated in said client system with a random number related to data included in said packet of data.

14. The computer-usable storage device, in accordance with claim 11, having computer readable instructions stored thereon for execution by a processor to perform a BIOS check.

15. An apparatus comprising:
   a network interface configured to detect a packet of data remotely transmitted from a mobile communication device;
   an electronic memory;
   a processor which is operatively coupled to said network interface and to said electronic memory and which executes code stored in said electronic memory, the processor, in response to execution of the code, deciphers at least a portion of the data in said detected packet of data to product a password key, determines if said password key allows access to a password required for boot-up, recovers said password if said password key allows access to such password, and utilizes said password to boot-up.

16. The apparatus, in accordance with claim 15, wherein said processor additionally checks that system is booting only to a client system hard drive.

17. The apparatus, in accordance with claim 15, wherein said processor additionally checks computer BIOS.

18. The apparatus, in accordance with claim 15, wherein said password is associated in said client system with a random number related to data included in said packet of data.

19. The apparatus, in accordance with claim 15, wherein performing a mathematical operation using said password and a random number forms said password key.

20. The apparatus, in accordance with claim 15, where said network interface hardware component is configured to detect Magic Packet data and cause power to be applied necessary for boot-up.

* * * * *